Patented Nov. 19, 1929

1,736,281

UNITED STATES PATENT OFFICE

ABRAHAM SIDNEY BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

METHOD OF MAKING BASE EXCHANGE MATERIALS

No Drawing.   Application filed December 29, 1924.   Serial No. 758,597.

The invention relates to a method of preparing base exchange materials and in particular to the preparation of artificial zeolites by the precipitation or wet process, and presents a method of procedure whereby alkali metal silicates and salts of amphoteric metals are utilized to the best advantage in producing base exchange materials, suitable for use in the softening of water.

In a former Patent No. 1,515,007 of November 11, 1924, I have disclosed a method of preparing base exchange materials by mixing at a comparatively low temperature concentrated solutions of sodium silicate and of aluminum sulphate in such proportions and degrees of concentration that almost immediately a gel is formed which occupies the entire reaction volume and embraces all of the constituent elements of the solutions. Upon drying and leaching the reaction mass is resolved into small hard porous particles excellently adapted for utilization in the softening of water and having a base exchange capacity of 8000 grains per cubic foot, calcium carbonate equivalent.

According to the process of the earlier patent referred to, the base exchange materials produced thereby not only had greater capacity per pound than materials occurring in nature or prepared by the fusion process or by precipitation processes employing dilute solutions, but the new materials had greater density and consequently greater capacity per volume of material used. One of the great advantages in increasing the volume capacity of these materials is that the apparatus in which they are disposed for utilization may be made correspondingly smaller with consequent savings in space, the cost of equipment, and of installation.

In the typical example of procedure cited in Patent No. 1,515,007, aluminum sulphate and commercial sodium silicate solution are used in the approximate ratio by weight of one part to five respectively. The material prepared according to that example has a density of forty pounds per cubic foot, an exchange capacity of 200 grains per pound, and a cubic foot capacity of 8000 grains, calcium carbonate equivalent.

I have found that the density of the product may be materially increased without sacrificing any material portion of the activity thus making it possible to add to the exchange capacity of a given volume of the material and to permit of greater economies in the provision of apparatus wherewith to carry on the exchange processes. This increase in density may be brought about by merely changing the ratio of the aluminum sulphate to sodium silicate solution. Thus I have established that if the proportion of the salt of an amphoteric metal to be mixed with an alkali metal silicate is increased, the exchange capacity of the resulting material per unit of volume will be correspondingly increased. For the most satisfactory results in this direction I have determined that when aluminum sulphate and sodium silicate solution are employed, the ratio of one part by weight of aluminum sulphate to four parts by weight of sodium silicate solution is correct.

The invention may therefore be said to reside in the definition of the proper proportions in which the salt of an amphoteric metal and the alkali metal silicate shall be employed to produce a material of satisfactory physical character and of maximum exchange capacity.

A practical example which may be followed in practicing the present invention is now presented.

Seventy five liters of an aqueous solution of commercial aluminum sulphate, containing 70 grams per liter a total of about 5250 grams, is cooled to nearly 0° C. The aluminum sulphate to which I refer as a commercial product is basic and corresponds roughly to the formula $Al_2(SO_4)_3.18H_2O$, and contains about 17 to 17½% $Al_2O_3$, of which about ½% to 1% is in excess of that theoretically required to combine with the $SO_3$ content aluminum sulphate corresponds approximately to the formula $Al_2O_3(SO_3)_{2.87}$. There will be about 8.85 moles of a sulphate of this formula added which contains approximately 25.4 moles of sulphur trioxide or about 51 moles of a monovalent acid radical. 21.3 kg. of commercial water glass (containing about 9% $Na_2O$ and 28.5% $SiO_2$ which corresponds to the approximate formula $Na_2O(SiO_2)_{3.27}$, is diluted with water to make 75 liters, and cooled to nearly 0° C. There will be 8000 grams or about 30.9 moles of the sodium polysilicate present. These two solutions are mixed at a temperature of about 5° C. As a result of the mixing a gel is formed which embraces all of the constituent elements of the solutions. After the gel has set, it is thoroughly dried at a temperature below 100° C., preferably between 60° and 80° C. After thorough drying the soluble substances are removed by leaching, incidental to which the material resolves into small hard glassy particles suitable for use in the softening of water. These particles will weigh about fifty pounds per cubic foot and will have a base exchange capacity of about 200 grains per pound, calcium carbonate equivalent. The capacity per cubic foot is therefore 10,000 grains.

The quantity of aluminum sulphate employed in the example cited is 24.6% by weight of the quantity of sodium silicate solution. The permissible range of variation is from 23% to 28%, the latter figure being about the limit that may be safely fixed, for beyond this proportion the base exchange capacity of the product decreases as its density increases. The corresponding variation in grams would be from 4910 grams to 5960 grams of commercial aluminum sulphate to 8000 grams of sodium polysilicate or 21300 grams of the sodium silicate solution. In moles the variation would be approximately from 8.3 to 10.1 moles of the aluminum sulphate (which would contain from 23.8 to 29 moles of $SO_3$) to 30.9 moles of the polysilicate. This corresponds to a range of 50 to 61 equivalents of aluminum sulphate or a similar amphoteric metal salt. The increase in density is obtained, of course at the sacrifice of a measure of the porosity which results with the alkali metal silicate predominating more than in the present example, but so long as the base exchange value is not appreciably reduced, the decrease in the porosity is not an important objection to the material so far as its utilization in the softening of water is concerned. The fixing of the proportion of one part by weight of aluminum sulphate to four parts by weight of sodium silicate must be limited of course to the employment of aluminum sulphate and sodium silicate of substantially the composition set forth in the example cited. It is obvious that if aluminum sulphate or sodium silicate of other composition is employed, this ratio must be modified in accordance with the different reacting values of the particular reagents substituted. Furthermore, if some other salt of an amphoteric metal is employed, as for example iron sulphate, the one to four ratio must likewise be modified to take into account the equivalent weights of aluminum sulphate and iron sulphate as will be apparent to those versed in the art.

I claim:

1. The method of producing a base exchange material which comprises mixing a solution of aluminum sulphate with a solution of sodium silicate in the approximate ratio of one part by weight of aluminum sulphate to four parts by weight of sodium silicate solution.

2. The method of producing a base exchange silicate which comprises mixing in solution about 31 moles of sodium silicate with about 9 moles of basic aluminum sulphate.

3. The method of producing a base exchange silicate which comprises mixing in solution about 31 moles of sodium silicate with about 8 to 10 moles of basic aluminum sulphate.

4. The method of producing a base exchange silicate which comprises mixing in solution about 31 moles of an alkali metal polysilicate with about 50 to 61 equivalents of an aluminum salt.

5. The method of producing a base exchange silicate which comprises mixing in solution about 31 moles of an alkali metal silicate with about 50 to 61 equivalents of an amphoteric metal salt.

6. The method of producing a base exchange silicate which comprises mixing in solution about 31 moles of an alkali metal silicate with about 50 to 61 equivalents of an amphoteric metal salt, the concentration being such that upon mixing a gel will form, embracing substantially all of the constituent elements of the mixture.

7. The method of producing a base exchange silicate which comprises mixing in solution about 31 moles of sodium silicate with about 8 to 10 moles of basic aluminum sulphate, the concentration being such that upon mixing a gel will form, embracing substantially all of the constituent elements of the mixture.

8. The method of producing a base exchange silicate which comprises mixing in solution about 31 moles of sodium silicate with about 8 to 10 moles of basic aluminum sulphate, the concentration being such that upon mixing a gel will form, embracing substantially all of the constituent elements of the mixture, drying the reaction mass, and then leaching.

9. The method of producing a base exchange material which comprises mixing a solution of aluminum sulphate with a solution of sodium silicate, the quantity of aluminum sulphate employed being between about 23 and 28% by weight of the sodium silicate solution.

In testimony whereof I have hereunto subscribed my name.

ABRAHAM SIDNEY BEHRMAN.